United States Patent [19]

Thornton

[11] Patent Number: 5,427,692
[45] Date of Patent: * Jun. 27, 1995

[54] REMOVAL OF CHROMIUM FROM SOLUTION USING FERROUS SULFATE AND BARIUM NITRATE

[75] Inventor: Roy F. Thornton, Schenectady, N.Y.

[73] Assignee: General Electric Company, Schenectady, N.Y.

[*] Notice: The portion of the term of this patent subsequent to May 16, 2012 has been disclaimed.

[21] Appl. No.: 158,579

[22] Filed: Nov. 29, 1993

[51] Int. Cl.6 ............................ C02F 1/52; C02F 1/70; C01G 37/00
[52] U.S. Cl. ...................................... 210/720; 210/913; 423/55; 204/DIG. 13
[58] Field of Search ................... 204/129.75, DIG. 12, 204/DIG. 13; 210/749, 757, 913, 720; 423/55, 57, 140

[56] References Cited

U.S. PATENT DOCUMENTS

| | | | |
|---|---|---|---|
| 2,110,187 | 3/1938 | Williams | 423/57 |
| 3,616,344 | 10/1971 | Peterson | 423/607 |
| 4,086,150 | 4/1978 | Kindl et al. | 204/95 |
| 4,481,090 | 11/1984 | Childs | 204/129.75 |
| 4,705,639 | 11/1987 | Aldrich | 423/55 |

FOREIGN PATENT DOCUMENTS

| | | | |
|---|---|---|---|
| 50-73896 | 6/1975 | Japan | 210/913 |
| 54-51972 | 4/1979 | Japan | 210/913 |

OTHER PUBLICATIONS

Article—Chapter 7, Removal of Chromate from Aqueous Streams by Ultrafiltration and Precipitation, EE Tucker et al—American Chemical Society (1992) pp. 84–98, no month.

Primary Examiner—Steven Bos
Attorney, Agent, or Firm—Noreen C. Johnson; James Magee, Jr.

[57] ABSTRACT

Hexavalent chromium is removed from aqueous sodium nitrate solutions by reacting hexavalent chromium with an aqueous slurry consisting essentially of ferrous hydroxide and barium sulfate whereby the chromium is reduced to trivalent chromium and precipitated as chromic hydroxide. Adulterating compounds and unwanted ions are not introduced to the electrolytic solution.

1 Claim, No Drawings

REMOVAL OF CHROMIUM FROM SOLUTION USING FERROUS SULFATE AND BARIUM NITRATE

FIELD OF THE INVENTION

This invention relates to a method for removal of hexavalent chromium from aqueous solutions, and more particularly, to the reduction of hexavalent chromium to trivalent chromium by reacting a chromium-contaminated sodium nitrate solution with an aqueous slurry consisting essentially of ferrous hydroxide and barium sulfate.

BACKGROUND OF THE INVENTION

Aqueous sodium nitrate solutions are among those used in industry to electrochemically machine articles made from stainless steel alloys. As known, stainless steel alloys contain varying amounts of chromium. Thus, when stainless steel alloys are electrochemically machined, part of the chromium metal in the alloy is converted to hexavalent chromium and remains in the aqueous sodium nitrate solution.

Hexavalent chromium accumulates in sodium nitrate solutions and is highly soluble over a wide range of pH. Since electrochemical machining (ECM) solutions are continuously reused, the build-up of hexavalent chromium poses potential environmental concerns, as well as possible health hazards to machine operators. In order to efficiently and safely reuse the aqueous sodium nitrate solutions, there is a need to develop a method that reduces hexavalent chromium to less toxic trivalent chromium, and removes chromium from ECM solutions without introducing unwanted ions.

A well-known method for removing chromium from electrolytic solutions involves ferrous ion reduction of hexavalent chromium to trivalent chromium. Typically, ferrous sulfate or ferrous chloride is employed as the reducing agent. The result is a mixture of iron hydroxides and chromic hydroxides which are precipitated under alkaline conditions. One drawback to ferrous ion reduction is that the sulfate or chloride ions remain in solution as unwanted ions. If ferrous nitrate were commercially available, it could be used and would not introduce unwanted ions to the solution.

Copending commonly owned application Ser. No. 08/080549 discloses a method to remove unwanted sulfate ions from chromium-contaminated sodium nitrate solutions. Along with ferrous sulfate, barium nitrate is added to the machining solution so that the sulfate is precipitated as insoluble barium sulfate. Sodium hydroxide is then utilized to raise the pH and complete the precipitation of the iron and chromium species as hydroxides. Unwanted sulfate ions are removed and the machining solution is suitable for reuse.

To avoid mixing reagents in and adjusting the pH of the entire volume of an electrochemical machining solution, there is a need for an inexpensive and efficient method of introducing a concentrated ferrous reducing agent to the solution without introducing unwanted ions to the solution.

SUMMARY OF THE INVENTION

The present invention fulfills the need by providing a safe, inexpensive method for removing hexavalent chromium from electrolytic solutions, such as sodium nitrate electrochemical machining solutions. The method is based on admixing a sufficient amount of an aqueous slurry comprising ferrous hydroxide and barium sulfate with an aqueous sodium nitrate solution. Upon the addition of the aqueous slurry to the electrolytic solution, ferrous hydroxide reduces the hexavalent chromium in solution to less-toxic trivalent chromium. Concurrently, the trivalent chromium is precipitated as chromium hydroxide due to the alkaline pH of the sodium nitrate solution. As a result, substantially all the chromium is removed from the electrolytic solution without the addition of unwanted ions or having to alter the pH of the electrolyte.

This invention avoids the problems associated with other ferrous ion reduction methods whereby additional unwanted ions, such as sulfates or chlorides, remain in solution requiring subsequent treatment for their removal. In the present invention, the sodium nitrate solution is restored to its original condition following the removal of chromium, as trivalent chromium hydroxide, and other insoluble materials. The electrolytic properties of the aqueous sodium nitrate solution are retained and the electrolyte may be reused.

One of the major benefits of this method is that sufficient ferrous hydroxide can be generated in a concentrated slurry. By so doing, a small amount of the ferrous hydroxide slurry can be used to treat a much larger volume of sodium nitrate electrolyte.

Another aspect of this invention is to provide a process that reduces hexavalent chromium to trivalent chromium and at the same time, precipitates the trivalent chromium as a hydroxide without lowering or raising the pH of the electrolytic solution. Thus, upon adding the alkaline slurry to the sodium nitrate solution, trivalent chromium hydroxide is formed as a precipitate at the electrolyte's operating pH.

Still another aspect of the present invention is to provide a process for reducing and removing chromium material from aqueous sodium nitrate solutions without using compounds that introduce unwanted ions. By admixing the alkaline ferrous hydroxide slurry with the aqueous sodium nitrate solution, the reduction of nitrate ions to nitrite ions or other lower valence nitrogen compounds is avoided.

Importantly, the practice of this invention reduces the sodium nitrate solution's toxicity and its potential hazard to machine operators and the environment. This invention can also be utilized to remove hexavalent chromium from sludge formed during electrochemical machining operations.

DETAILED DESCRIPTION OF THE INVENTION

To remove hexavalent chromium from an aqueous sodium nitrate electrochemical machining electrolyte or sludge, a sufficient amount of an aqueous slurry comprising ferrous hydroxide, $Fe(OH)_2$, and barium sulfate, $Ba(SO_4)$, is added to chemically reduce all the hexavalent chromium to trivalent chromium. A sufficient amount of the slurry is at least three moles of ferrous hydroxide per mole of hexavalent chromium. The three moles of ferrous hydroxide per mole of hexavalent chromium is also referred to as the stoichiometric amount of reactants needed to produce one mole of trivalent chromium and one mole of ferric hydroxide. However, in the practice of this invention, more than three moles of ferrous hydroxide may be required because ferrous hydroxide is also consumed by oxygen dissolved or entrained in the electrolyte. Thus, an excess of the stoichiometric amount of ferrous hydroxide is preferred to assure substantially complete reduction of hexavalent chromium to produce trivalent chromium.

The pH of the sodium nitrate electrolyte is usually operated between about 8 and about 10. As a result, the trivalent chromium forms as precipitated chromic hydroxide, $Cr(OH)_3$, upon the addition of the alkaline slurry to the electrolytic solution. The alkaline slurry has a pH of at least 8, and preferably between 9 and 10.

The aqueous slurry is generated by reacting ferrous sulfate, barium nitrate, and sodium hydroxide in water or an aliquot of the ECM solution. Such reactants are added in proportions which produce precipitated ferrous hydroxide and precipitated barium sulfate, suspended in a solution which contains sodium nitrate and traces of barium ions and sulfate ions. This is accomplished by mixing essentially equal numbers of moles of ferrous sulfate and barium nitrate.

A convenient way of producing the alkaline slurry is to add solid barium nitrate and solid ferrous sulfate heptahydrate to an aliquot of the ECM electrolyte. The mixture is stirred until the reactants are completely dissolved in the electrolyte solution and barium sulfate has precipitated. The barium sulfate can be removed at this point by settling or filtration, but this is not necessary. Ferrous hydroxide is then precipitated by adding sodium hydroxide until the pH of the slurry is greater than 8, and preferably between 9 and 10.

Upon addition of the slurry to the ECM electrolyte, ferrous hydroxide is oxidized by hexavalent chromium to precipitate ferric hydroxide. Barium sulfate remains an insoluble material in solution. The mixture is stirred for several minutes to an hour, and the precipitates, insoluble material, and sludge are separated from the electrolyte by conventional means, such as settling, clarification, or filtration.

After the removal of chromium hydroxide and insoluble materials from the electrolyte, if necessary, the pH of the ECM solution is adjusted to its operating range with sodium hydroxide or nitric acid. Likewise, the concentration of sodium nitrate in the electrolyte is adjusted by the addition of sodium nitrate salt or by the addition of water. The concentration of the aqueous sodium nitrate solution ranges from about 50 grams per liter to about 600 grams per liter. The preferred operating concentration is about 270 grams per liter or three molar.

The net result of these operations is to remove essentially all of the chromium, as chromium hydroxide, from the electrochemical machining solution without introducing adulterating compounds that might interfere with the process.

The invention is illustrated by the following examples.

EXAMPLE 1

Solution A was made comprising 8.63 ppm(wt) hexavalent chromium and 270 grams per liter sodium nitrate. The chromium was in the form of sodium chromate.

Mixture B was made by adding 4.003 grams ferrous sulfate heptahydrate and 3.782 grams barium nitrate to 58.77 grams sodium nitrate solution (270 grams per liter). The mixture was stirred for about one hour at which time no residual barium nitrate crystals were visible. A fine, pale-green precipitate had formed, and the pH was about 5, determined using pH paper. To this mixture was added 7.0 grams of 5N sodium hydroxide with stirring. A thick slurry of dark green precipitate formed, and the pH was greater than 8.

Approximately a 5% stoichiometric excess of mixture B was added to solution A, and the solution was stirred. The theoretical amount of ferrous ion required to reduce hexavalent chromium to trivalent chromium is three moles per mole of hexavalent chromium. The precipitate quickly turned brown except for a few visible particles. After five minutes of stirring, the solution was centrifuged. The supernatant was analyzed by visible light absorption at 372 NM and found to contain 2.5 ppm hexavalent chromium. After 26 minutes of stirring, the supernatant contained 1.5 ppm hexavalent chromium. The pH of the solution was about 6.

Additional mixture B was added to a total stoichiometric excess of 48%. After an additional 20 minutes of stirring, the supernatant contained 0.05 ppm hexavalent chromium, and the pH was about 6. The uncertainty in the measurement was about 0.05 ppm.

EXAMPLE 2

Solution C was made comprising 8.4 ppm(wt) hexavalent chromium and sodium nitrate with a concentration of 270 grams per liter. Two drops of 5N sodium hydroxide were added, and the resulting pH was approximately 12 using pH paper.

Mixture D was made by adding 2.01 grams ferrous sulfate and 1.907 grams barium nitrate to 50.15 grams of sodium nitrate solution (270 grams per liter). The mixture was stirred for one-half hour. Sodium hydroxide solution, 4.98 grams of 5N sodium hydroxide, was added while the mixture was stirred. The pH of the solution was greater than 12.

An aliquot of mixture D was added to solution C with stirring. The amount of ferrous hydroxide calculated to be in the aliquot was 68% stoichiometric excess over that necessary to reduce all the hexavalent chromium. The solution remained alkaline. After one-half hour of stirring, the solution was centrifuged. The concentration of hexavalent chromium in the supernatant was 0.5 ppm(wt). The major reason that excess ferrous hydroxide is required is that for each 1 ppm oxygen in the solution, 23% excess ferrous hydroxide is consumed by the oxygen.

These examples illustrate that hexavalent chromium can be removed to less than 1 ppm by essentially simultaneous reduction by ferrous hydroxide and precipitation as trivalent chromium hydroxide in solutions ranging from slightly acidic to strongly alkaline. Because all the iron, barium, and sulfate are precipitated out of solution, the net result of the treatment is to remove the hexavalent chrome without adding extraneous ions.

What is claimed is:

1. A method for removing hexavalent chromium from an aqueous sodium nitrate solution containing hexavalent chromium, comprising the steps of:
    admixing ferrous sulfate and barium nitrate with an aliquot of the aqueous sodium nitrate solution to form an admixture;
    stirring the admixture of ferrous sulfate, barium nitrate, and the aliquot of the aqueous sodium nitrate solution until the ferrous sulfate and barium nitrate are completely dissolved, thereby precipitating sulfate ions as barium sulfate;
    precipitating ferrous hydroxide by adding sodium hydroxide to said admixture until the pH is between about 8 and about 10, thereby forming a slurry comprising ferrous hydroxide and barium sulfate; and admixing the slurry comprising ferrous hydroxide and barium sulfate to the aqueous sodium nitrate solution containing hexavalent chromium to reduce hexavalent chromium to trivalent chromium thereby removing said hexavalent chromium from the sodium nitrate solution.

* * * * *